(12) United States Patent
Yasuda

(10) Patent No.: US 7,061,002 B2
(45) Date of Patent: Jun. 13, 2006

(54) RADIATION IMAGE READ-OUT APPARATUS

(75) Inventor: Hiroaki Yasuda, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 375 days.

(21) Appl. No.: 10/733,642

(22) Filed: Dec. 12, 2003

(65) Prior Publication Data

US 2004/0124379 A1    Jul. 1, 2004

(30) Foreign Application Priority Data

Dec. 12, 2002    (JP) .............................. 2002-360795

(51) Int. Cl.
*G01N 23/04*    (2006.01)
(52) U.S. Cl. ..................................... 250/584
(58) Field of Classification Search ................. 250/584
See application file for complete search history.

(56) References Cited

U.S. PATENT DOCUMENTS 5,038,037 A * 8/1991 Saotome ..................... 250/583
5,365,076 A * 11/1994 Itakura ........................ 250/582
6,624,439 B1 * 9/2003 Arakawa ..................... 250/586

FOREIGN PATENT DOCUMENTS

JP    2561156 B2    9/1996
JP    2835622 B2    10/1998

* cited by examiner

*Primary Examiner*—David Porta
*Assistant Examiner*—Marcus Taningco
(74) *Attorney, Agent, or Firm*—Sughrue Mion, PLLC

(57) ABSTRACT

A radiation image read-out apparatus includes a plurality of radiation image convertor panels superposed one on another in a direction in which radiation passing through an object propagates. A separator separates the superposed radiation image convertor panels exposed to the radiation passing through the object from one another by moving in a parallel displacement and/or rotating about an axis on a plane parallel to the surfaces of the radiation image convertor panels one or more of the superposed radiation image convertor panels relatively to the others. A single detecting head detects stimulated emission emitted from each of the radiation image convertor panels separated by the separator.

14 Claims, 13 Drawing Sheets

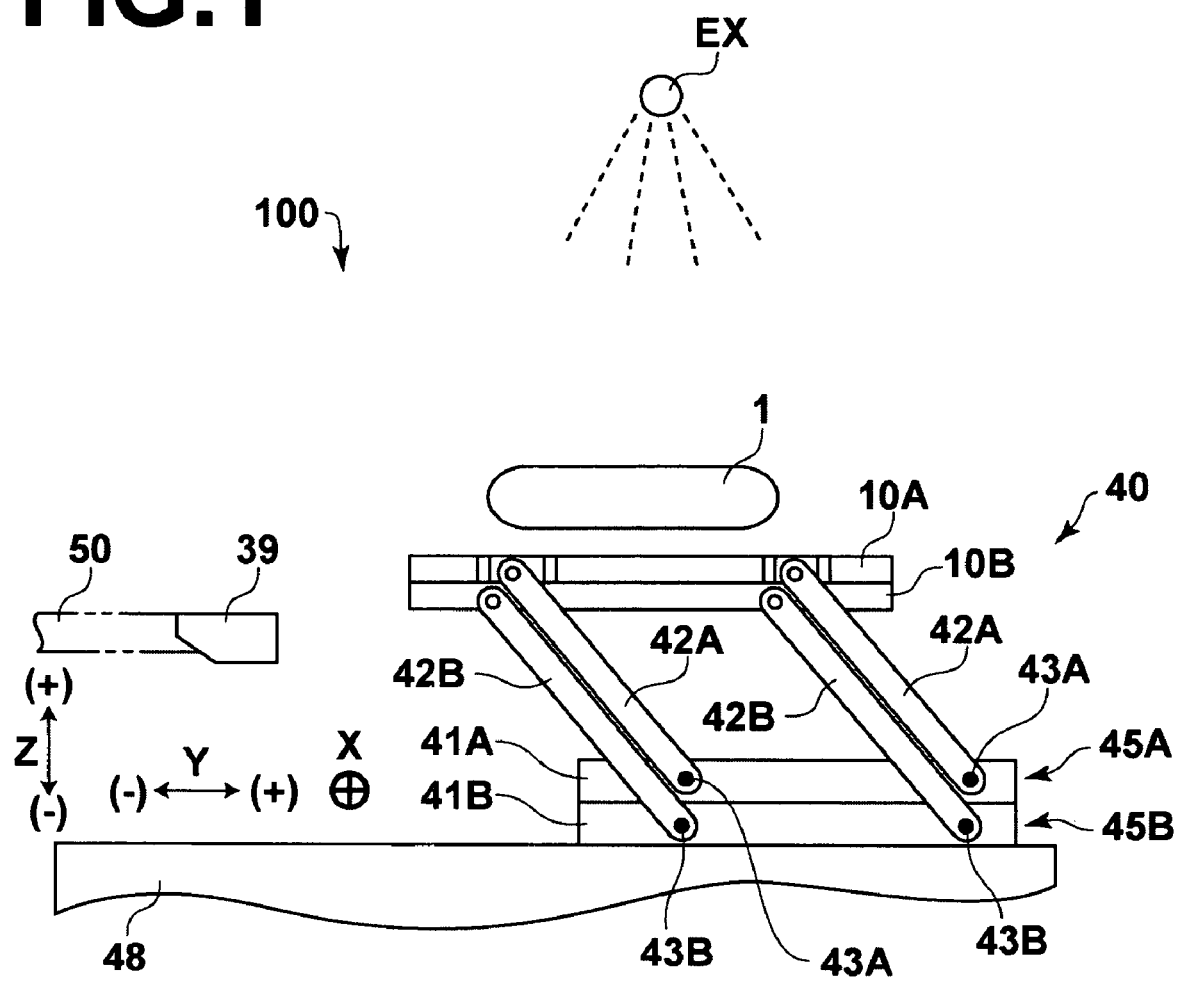

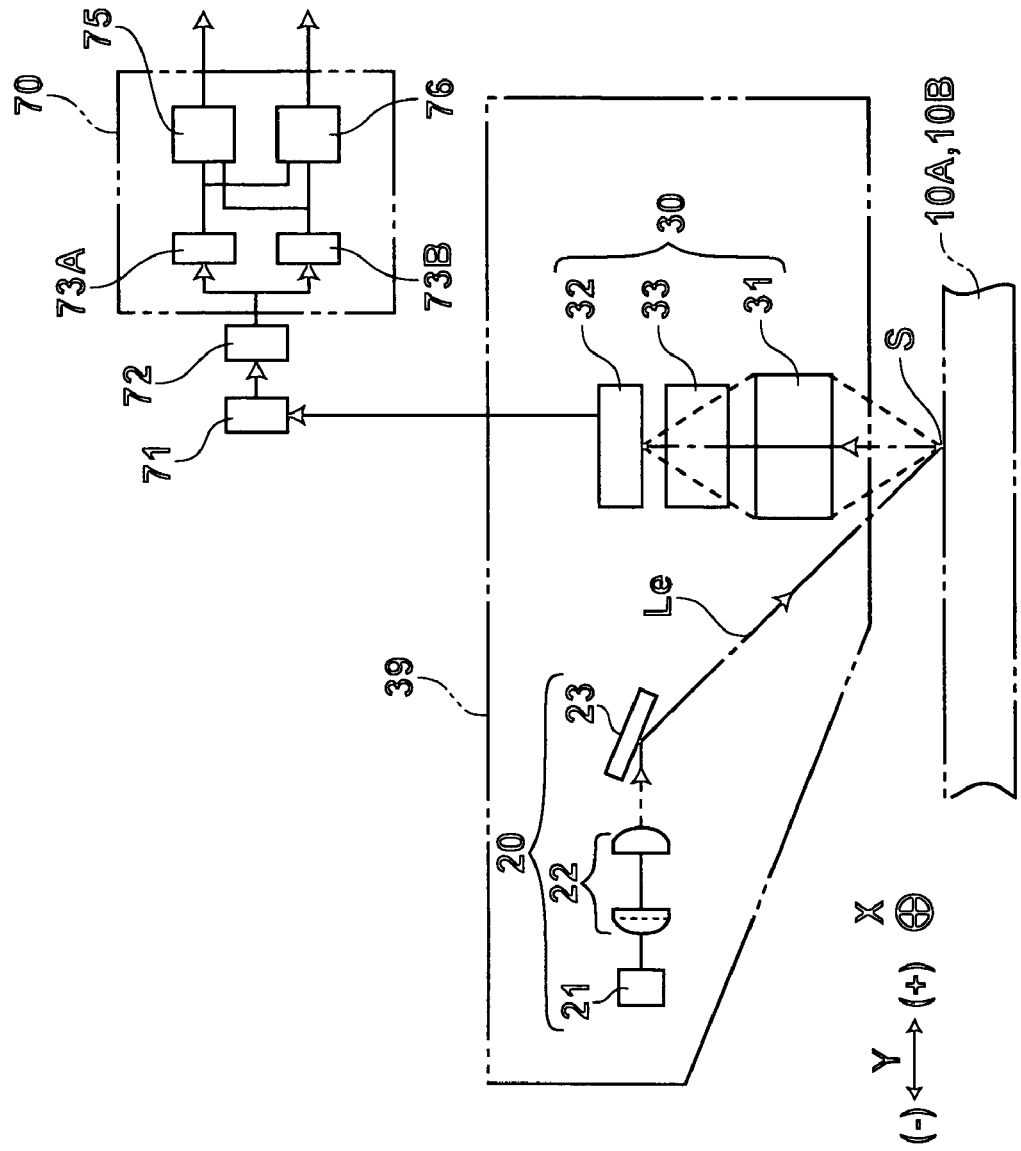

FIG.7A
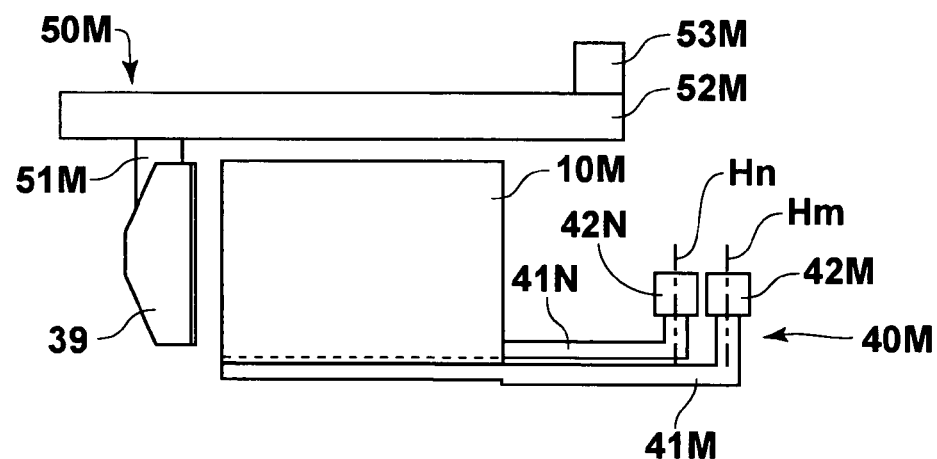
FIG.7B
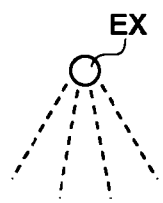
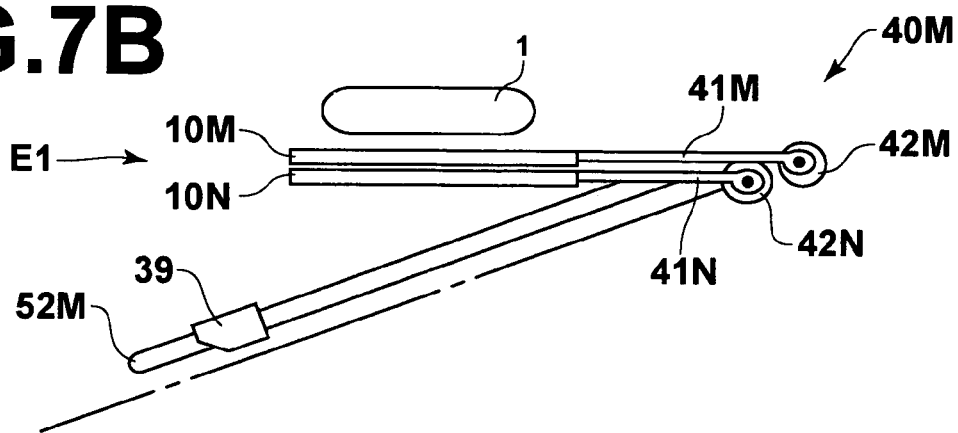

RADIATION IMAGE READ-OUT APPARATUS

BACKGROUND OF THE INVENTION

1. Field of the Invention

This invention relates to a radiation image read-out apparatus, and more particularly to a radiation image read-out apparatus which obtains image data representing a radiation image recorded on each radiation image convertor panel recorded by exposing a plurality of radiation image convertor panels to radiation with the radiation image convertor panels superposed one on another.

2. Description of the Related Art

When certain kinds of phosphors are exposed to radiation such as X-rays, they store a part of energy of the radiation. Then when the phosphors which have been exposed to the radiation are exposed to stimulating light such as visible light, light having a wavelength shorter than the stimulating light is emitted from the phosphors in proportion to the stored energy of the radiation. Phosphors exhibiting such properties are generally referred to as "stimulable phosphors". In this specification, the light emitted from the stimulable phosphors upon stimulation thereof will be referred to as "stimulated emission". There has been known as a CR (computed radiography) a radiation image recording and reproducing system, comprising a radiation image recording apparatus and a radiation image read-out apparatus, in which a layer of the stimulable phosphors is exposed to a radiation passing through an object such as a human body to have a radiation image of the object once stored on the stimulable phosphor layer as a latent image, stimulating light such as a laser beam is subsequently projected onto the stimulable phosphor layer, and the stimulated emission emitted from the stimulable phosphor layer is photoelectrically detected, thereby obtaining an image signal (a radiation image signal) representing a radiation image of the object. There has been known a radiation image convertor panel comprising a stimulable phosphor layer formed on a substrate as a recording medium employed in the radiation image recording and reproducing system.

The apparatus for obtaining image data (image signal) representing a radiation image of the object includes those which operate in various systems. For example, there has been known an apparatus in which a pair of radiation image convertor panels superposed one on the other with a copper plate or the like absorbing radiation intervening therebetween are exposed to radiation passing through an object so that low energy components of the radiation are more absorbed by the radiation image convertor panel nearer to the object, whereby a low energy radiation image of the object is recorded on the radiation image convertor panel, and high energy components of the radiation are more absorbed by the radiation image convertor panel remoter from the object, whereby a high energy radiation image of the object is recorded on the radiation image convertor panel, the pair of radiation image convertor panels are separated from each other so as not to be deformed, and stimulated emission emitted from each of the radiation image convertor panels upon exposure to stimulating light is detected by the use of a photodetector exclusive to the radiation image convertor panel, thereby obtaining two pieces of image data respectively representing a low energy radiation image and a high energy radiation image of the object. See, for instance, Japanese Patent Nos. 2561156 and 2835622.

Further, there has been known the fact that high quality radiation image information representing a radiation image of the object by an operation involving the two pieces of image data respectively representing a low energy radiation image and a high energy radiation image of the object. As such an operation, there have been known a so-called energy subtraction processing for extracting a particular structure in the object or a so-called superposition processing for clearly showing slight differences in absorption of the radiation in the object.

However, the conventional apparatus in which the two pieces of image data are obtained from a pair of radiation image convertor panels superposed one on the other is disadvantageous in that the overall size of the apparatus is increased as compared with an apparatus in which a single piece of image data is obtained from a single radiation image convertor panel since the stimulated emission emitted from each of the radiation image convertor panels is detected by the use of a photodetector exclusive to the radiation image convertor panel.

SUMMARY OF THE INVENTION

In view of the foregoing observations and description, the primary object of the present invention is to provide a radiation image read-out apparatus which can detect stimulated emissions emitted from a pair of radiation image convertor panels exposed to radiation in a superposed state and each representing a radiation image recorded on the radiation image convertor panel and can be small in size.

The radiation image read-out apparatus in accordance with the present invention comprises a plurality of radiation image convertor panels superposed one on another in a direction in which radiation passing through an object propagates, a separator which separates the superposed radiation image convertor panels exposed to the radiation passing through the object from one another by moving in a parallel displacement and/or rotating about an axis on a plane parallel to the surfaces of the radiation image convertor panels one or more of the superposed radiation image convertor panels relatively to the others, and a single detecting head which detects stimulated emission emitted from each of the radiation image convertor panels separated by the separator, and obtains a plurality of pieces of image data each representing a radiation image of the object recorded on each of the radiation image convertor panels by exposure to the radiation on the basis of output from the detecting head.

The expression "moving in a parallel displacement and/or rotating one or more of the superposed radiation image convertor panels relatively to the others" includes both a case where one of "one or more of the superposed radiation image convertor panels" and "the others" is moved and/or rotated with the other kept stationary and a case where both of the "one or more of the superposed radiation image convertor panels" and "the others" are moved and/or rotated.

The detecting head may detect the stimulated emission from either the surface of the radiation image convertor panel from which the radiation impinges upon the radiation image convertor panel or the surface of the radiation image convertor panel opposite to the surface from which the radiation impinges upon the radiation image convertor panel.

The radiation image read-out apparatus of the present invention may be provided with an image processing means which carries out an energy subtraction processing or a superposition processing by the use of the pieces of image data obtained from the respective radiation image convertor panels.

The radiation image read-out apparatus of the present invention may be provided with a moving means which moves the detecting head along each of the separated radiation image convertor panels and the detecting head may be arranged to detect the stimulated emission while being moved by the moving means.

The radiation image read-out apparatus of the present invention may be provided with a reciprocating means which reciprocates back and forth the detecting head along each of the separated radiation image convertor panels and the detecting head may be arranged to detect the stimulated emission on both the forward travel and the backward travel by the reciprocating means.

The radiation image convertor panels may be different in shape.

The radiation image convertor panels may be provided with a locator member which keeps the space between the detecting head and the surface of the radiation image convertor panel facing the detecting head at a predetermined space during detection of the stimulated emission from the radiation image convertor panel.

Each of the radiation image convertor panels may be provided thereon with a light emitting plate which transmits the radiation and emits erasing light which erases radiation energy remaining in the radiation image convertor panel.

For example, the radiation image convertor panels are arranged so that a radiation image convertor panel remoter from the object absorbs more radiation when all the radiation image convertor panels are exposed to given radiation under the same conditions.

The radiation image read-out apparatus of the present invention may detect the stimulated emissions from the radiation image convertor panels so that high-frequency component of the information representing the object is more abbreviated in a radiation image convertor panel which is positioned remoter from the object when the radiation image convertor panels are exposed to the radiation passing through the object.

The radiation image convertor panel may comprise a stimulable phosphor layer and a substrate which supports the stimulable phosphor layer, and the substrate may double as a radiation absorbing filter which absorbs the radiation.

The radiation image convertor panel may comprise a substrate and a stimulable phosphor layer of columnar crystal stimulable phosphors formed on the substrate by vapor building-up.

In the radiation image read-out apparatus of the present invention, since the stimulated emissions emitted from the respective radiation image convertor panels are detected by the single detecting head, the apparatus can be small in overall size.

When the detecting head detects the stimulated emission from the surface of the radiation image convertor panel from which the radiation impinges upon the radiation image convertor panel, the stimulated emission detected by the detecting head can be higher in intensity, whereby image data representing a higher quality radiation image can be obtained.

When the detecting head detects the stimulated emission from the surface of the radiation image convertor panel opposite to the surface from which the radiation impinges upon the radiation image convertor panel, the amount of movement of the radiation image convertor panels by the separator can be reduced, whereby load on the separator can be lightened, and at the same time, the overall cycle time for obtaining the image data from a radiation image convertor panel can be shortened.

When the radiation image read-out apparatus of the present invention is provided with an image processing means which carries out an energy subtraction processing or a superposition processing by the use of the pieces of image data obtained from the respective radiation image convertor panels, the diagnostic performance by the energy subtraction processing can be improved or the image quality by the superposition processing can be improved.

When the radiation image read-out apparatus of the present invention is provided with a moving means which moves the detecting head along each of the separated radiation image convertor panels and the detecting head is arranged to detect the stimulated emission while being moved by the moving means, no space is required to move the radiation image convertor panels, whereby the apparatus can be smaller in overall size.

When the radiation image read-out apparatus of the present invention is provided with a reciprocating means which reciprocates back and forth the detecting head along each of the separated radiation image convertor panels and the detecting head is arranged to detect the stimulated emission on both the forward travel and the backward travel by the reciprocating means, the overall cycle time for obtaining the image data from a radiation image convertor panel can be shortened.

When the radiation image convertor panels are different in shape, separation of the radiation image convertor panels by the separator is facilitated.

When the radiation image convertor panels are provided with a locator member which keeps the space between the detecting head and the surface of the radiation image convertor panel facing the detecting head at a predetermined space during detection of the stimulated emission from the radiation image convertor panel, image data more accurately representing the radiation image recorded on the radiation image convertor panel can be obtained.

When each of the radiation image convertor panels is provided thereon with a light emitting plate which transmits the radiation and emits erasing light which erases radiation energy remaining in the radiation image convertor panel, the space occupied by an erasing means for erasing radiation energy remaining in the radiation image convertor panel can be greatly reduced. Further, since erasing light can be projected simultaneously on all the radiation image convertor panels, the overall cycle time for obtaining the image data from a radiation image convertor panel can be shortened.

When the radiation image convertor panels are arranged so that a radiation image convertor panel remoter from the object absorbs more radiation when all the radiation image convertor panels are exposed to given radiation under the same conditions, the radiation energy stored in a radiation image convertor panel remoter from the object can be more as compared with the conventional arrangement, whereby image data representing a higher quality radiation image can be obtained. Accordingly, the quality of the radiation image obtained by, for instance, energy subtraction processing or superposition processing can be improved.

When the radiation image read-out apparatus of the present invention detects the stimulated emissions from the radiation image convertor panels so that high-frequency component of the information representing the object is more abbreviated in a radiation image convertor panel which is positioned remoter from the object when the radiation image convertor panels are exposed to the radiation passing through the object, the overall cycle time for obtaining the image data from a radiation image convertor panel can be shortened by increasing the speed of the detecting head when detecting the stimulated emission emitted from a remoter radiation image convertor panel, energy consumption can be reduced by weakening the intensity of the stimulating light to be projected onto the radiation image convertor panels and/or the sensitivity in detecting the stimulated emission can be improved by reducing the resolution of the detecting head. In the case where the detecting head comprises a CCD element, the resolution of the detecting head can be reduced and the sensitivity in detecting the stimulated emission can be improved by binning the electric charges obtained through the photoelectric conversion.

When the radiation image convertor panel comprises a stimulable phosphor layer and a substrate which supports the stimulable phosphor layer, and the substrate may double as a radiation absorbing filter which absorbs the radiation, the apparatus can be smaller in overall size.

When the radiation image convertor panel comprises a substrate and a stimulable phosphor layer of columnar crystal stimulable phosphors formed on the substrate by vapor building-up, the radiation image represented by image data obtained by detecting the stimulated emission emitted from the radiation image convertor panel upon exposure to the stimulating light can be high in sharpness.

BRIEF DESCRIPTION OF THE DRAWINGS

FIG. 1 is a side view showing a radiation image read-out apparatus in accordance with an embodiment of the present invention, FIG. 2 is an enlarged side view showing the detecting unit, FIG. 7A is a plan view showing a radiation image read-out apparatus in accordance with another embodiment of the present invention, FIG. 7B is a side view of the same.

DESCRIPTION OF THE PREFERRED EMBODIMENTS

Figure 3A:
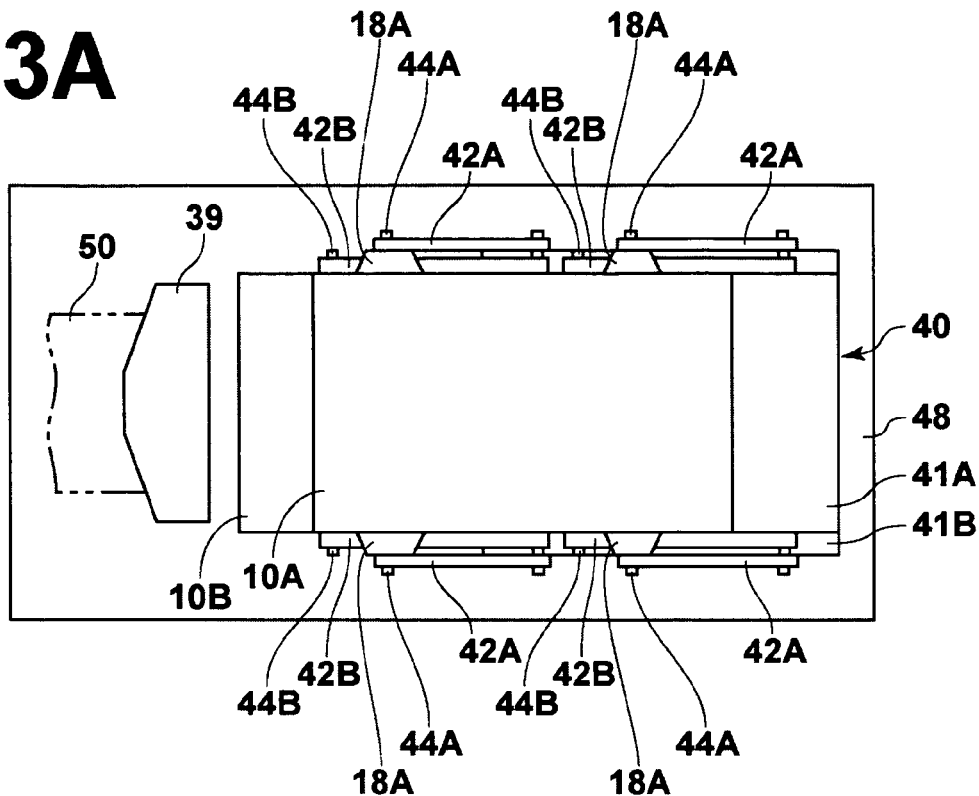
FIGS. 3A and 3B are a plan view and a side view, respectively, showing the separator unit.

As shown in FIGS. 1, 2, 3A and 3B, the radiation image read-out apparatus 100 in accordance with an embodiment of the present invention comprises a pair of radiation image convertor panels 10A and 10B superposed one on the other in a direction in which radiation emitted from a radiation source EX and passing through an object 1 propagates, a separator unit 40 which separates the superposed radiation image convertor panels 10A and 10B exposed to the radiation passing through the object 1 from each other by moving in a parallel displacement one of the superposed radiation image convertor panels 10A and 10B relatively to the other, a stimulating light beam projecting system 20 which projects a stimulating light beam Le and a detecting unit 39 including a single detecting head 30 which detects stimulated emission emitted from each of the radiation image convertor panels 10A and 10B upon exposure to the stimulating light beam Le, and obtains a pair of pieces of image data each representing a radiation image of the object 1 recorded on each of the radiation image convertor panels 10A and 10B by exposure to the radiation on the basis of output from the detecting head 30.

Each of the radiation image convertor panels 10A and 10B comprises a substrate formed of glass material and a stimulable phosphor layer of columnar crystal stimulable phosphors formed on the substrate by vapor building-up.

Figure 3B:
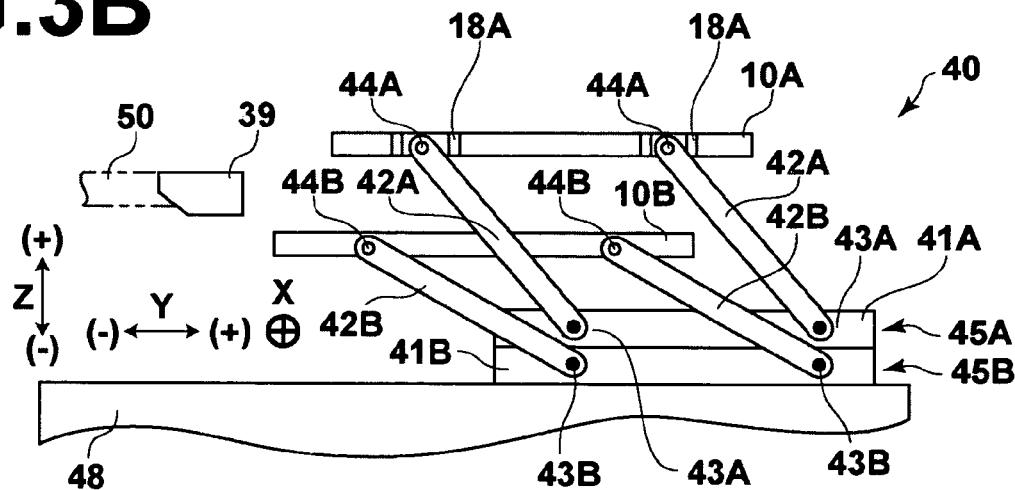

The radiation image convertor panels 10A and 10B are different from each other in shape in a direction perpendicular to the surfaces thereof (the direction of arrow Z in FIGS. 1 and 3B: will be referred to as "Z-direction", hereinbelow.). That is, the radiation image convertor panels 10A and 10B are different from each other in shape, and the radiation image convertor panel 10A is provided with four projections 18A (FIGS. 3A and 3B) with which swing arms of the separator unit 40 to be described later are engaged.

The stimulating light projecting system 20 comprises a broad area laser 21 which emits a stimulating light beam Le, a condenser optical system 22 which includes, for instance, a toric lens and converges the stimulating light beam Le in a line-like area S extending in the main scanning direction X on the radiation image convertor panel 10A by way of a reflecting mirror 23, and projects onto the surface of the radiation image convertor panel 10A a line-like stimulating light beam Le.

The detecting head 30 comprises an imaging lens system 31 formed by a number of lenses arranged in the main scanning direction X, a stimulating light cut filter 33 which transmits the stimulated emission but cuts the stimulating light and the line sensor 32 comprises a number of photo sensors (e.g., CCDs) arranged in the main scanning direction X. These elements are arranged in this order toward the radiation image convertor panels 10A and 10B. The imaging lens system 31 comprises, for instance, a number of refractive index profile type lenses arranged in the main scanning direction X and forms an erected image of the line-like area S of the radiation image convertor panels 10A and 10B exposed to the stimulating light beam Le on the line sensor 32 at a unit magnification.

The stimulating light projecting system 20 and the detecting head 30 are integrated into the detecting unit 39, which is conveyed in the sub-scanning direction Y (shown by arrow Y in FIGS. 1 and 2) perpendicular to the main scanning direction X by a conveyor means 50.

The separator unit 40 comprises first and second swing systems 45A and 45B which respectively support the radiation image convertor panels 10A and 10B to move the radiation image convertor panels 10A and 10B back and forth in the Z-direction.

The second swing system 45B comprises a base plate 41B disposed on a platen 48, four rotary shafts 43B which are projected outward in directions parallel to the main scanning direction X from the side surfaces of the base plate 41B two on each side surface of the same and electrically driven in the regular and reverse directions and four swing arms 42B connecting the radiation image convertor panel 10B and the four rotary shafts 43B. Each swing arm 42B is fixed to one of the rotary shafts 43B at its one end and is engaged for rotation at its the other end with one of four projections 44B which are projected outward in directions parallel to the main scanning direction X from the side surfaces of the radiation image convertor panel 10B so that the radiation image convertor panel 10B is moved back and forth in the Z-direction in response to rotation of the rotary shafts 44B in the regular and reverse directions.

The first swing system 45A comprises a base plate 41A fixed to the base plate 41B of the second swing system 45B disposed on a platen 48, four rotary shafts 43A which are projected outward in directions parallel to the main scanning direction X from the side surfaces of the base plate 41A two on each side surface of the same and electrically driven in the regular and reverse directions and four swing arms 42A connecting the radiation image convertor panel 10A and the four rotary shafts 43A. Each swing arm 42A is fixed to one of the rotary shafts 43A at its one end and is engaged for rotation at its the other end with one of four projections 44A which are projected outward in directions parallel to the main scanning direction X from the top of the four projections 18A formed on the side surfaces of the radiation image convertor panel 10A so that the radiation image convertor panel 10A is moved back and forth in the Z-direction in response to rotation of the rotary shafts 44A in the regular and reverse directions. The rotary shafts 43A and 43B are formed by output shafts of torque motors (not shown) which are disposed inside the base plate 41A and 41B.

The radiation image read-out apparatus 100 further comprises an A/D convertor 71 which digitizes analog image signal as photoelectrically converted by the line sensor 32 into a digital image signal, an image buffer 72 which stores the digital image signal and an image processing means 70 which carries out an energy subtraction processing or a superposition processing by the use of low energy image data representing a low energy radiation image obtained from the radiation image convertor panel 10A and high energy image data representing a high energy radiation image obtained from the radiation image convertor panel 10B.

The image processing means 70 comprises an image memory 73A which stores the low energy image data representing a low energy radiation image obtained from the radiation image convertor panel 10A and input from the image buffer 72, an image memory 73B which stores the high energy image data representing a high energy radiation image obtained from the radiation image convertor panel 10B and input from the image buffer 72, an energy subtraction system 75 which carries out an energy subtraction processing on the basis of the low energy radiation data and the high energy radiation data respectively input from the image memories 73A and 73B, and a superposition system 76 which carries out a superposition processing on the basis of the low energy radiation data and the high energy radiation data respectively input from the image memories 73A and 73B.

Operation of the radiation image read-out apparatus 100 in accordance with this embodiment will be described, hereinbelow.

FIGS. 4A to 4E are views for illustrating detection of the stimulated emission from the surface of the radiation image convertor panel from which the radiation impinges upon the radiation image convertor panel.

Figure 4A:
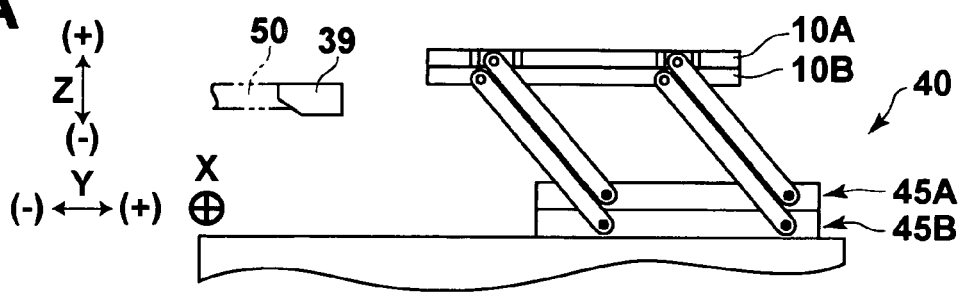
FIGS. 4A to 4E are views for illustrating detection of the stimulated emission from the surface of the radiation image convertor panel from which the radiation impinges upon the radiation image convertor panel.

As shown in FIG. 4A, the radiation image convertor panels 10A and 10B are moved in the +Z-direction to the radiation image recording position respectively by the first and second swing systems 45A and 45B so that the radiation image convertor panel 10B is superposed on the radiation image convertor panel 10A from below.

In this state, radiation is emitted from the radiation source EX and projected onto the radiation image convertor panel 10A. Then the radiation image convertor panel 10B is exposed to the radiation passing through the radiation image convertor panel 10A. In this manner, a low energy radiation image of the object 1 is recorded on the radiation image convertor panel 10A and a high energy radiation image of the object 1 is recorded on the radiation image convertor panel 10B.

Then one of the radiation image convertor panels 10A and 10B is moved in a parallel displacement relatively to the other, and the radiation image convertor panels 10A and 10B are separated.

Figure 4B:
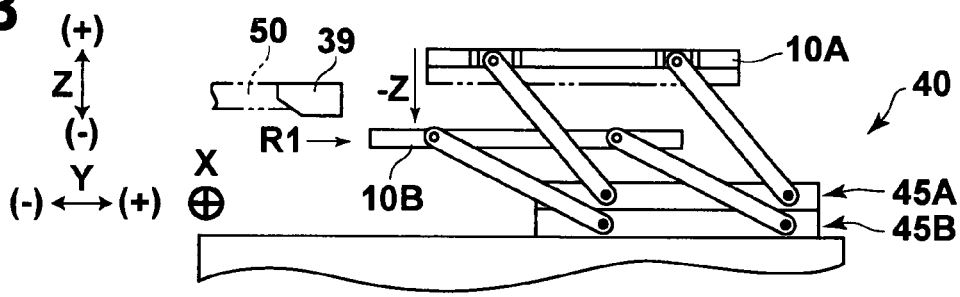

That is, after the superposed radiation image convertor panels 10A and 10B are exposed to the radiation passing through the object 1, the radiation image convertor panel 10B is moved in the −Z-direction in a parallel displacement by the second swing system 45B to a reading position R1 as shown in FIG. 4B.

Figure 4C:
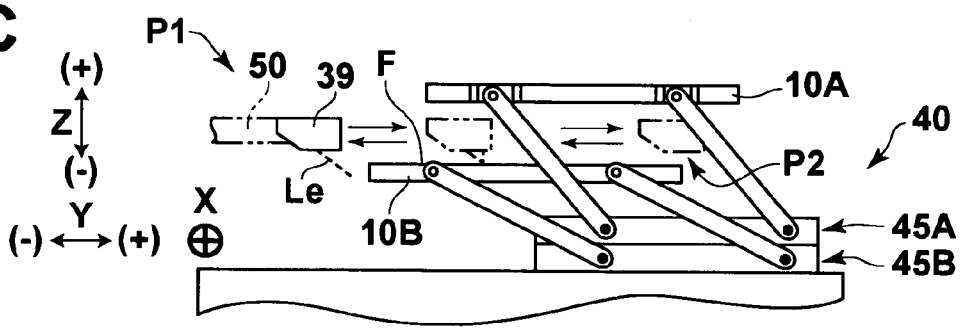

Then the detecting unit 39 is conveyed from an initial position P1 at a speed in the +Y-direction by the conveyor means 50 and a line-like stimulating light beam Le is projected onto the surface F of the radiation image convertor panel 10B from the stimulating light projecting system 20 of the detecting unit 39 as shown in FIG. 4C. Stimulated emission emitted from a line-like area S of the radiation image convertor panel 10B exposed to the stimulating light beam Le is imaged on the line sensor 32 by way of the imaging lens system 31 and the stimulating light cut filter 33, whereby high energy radiation image data representing a high energy radiation image recorded on the radiation image convertor panel 10B is output from the detecting head 30 through photoelectric conversion of the stimulated emission. The detecting unit 39, which has been in a read-out end position P2 since reading of the radiation image on the radiation image convertor panel 10B was ended, is returned to the initial position P1 by the conveyor means 50.

The high energy radiation image data output from the detecting head 30 is digitized by the A/D convertor 71, and a digital image signal is once stored in the image buffer 72.

The image processing means 70 reads out the digital image signal (high energy radiation image data) from the image buffer 72 and stores it in the image memory 73B.

Figure 4D:
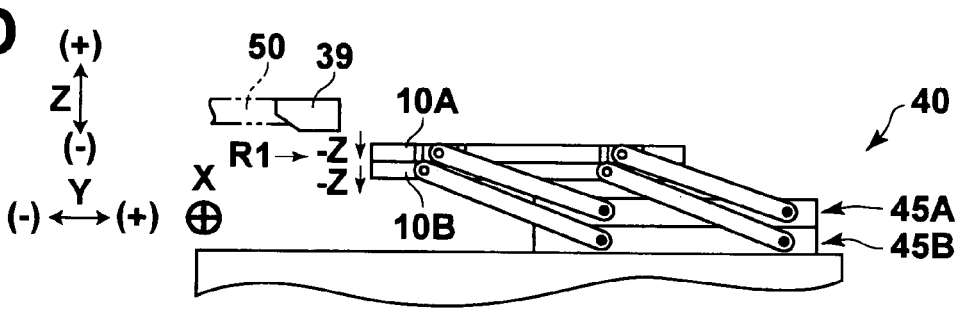

Thereafter, the radiation image convertor panel 10B is moved in −Z-direction away from the reading position R1 by the second swing system 45B and the radiation image convertor panel 10A is moved in −Z-direction to the reading position R1 by the first swing system 45A as shown in FIG. 4D.

Figure 4E:
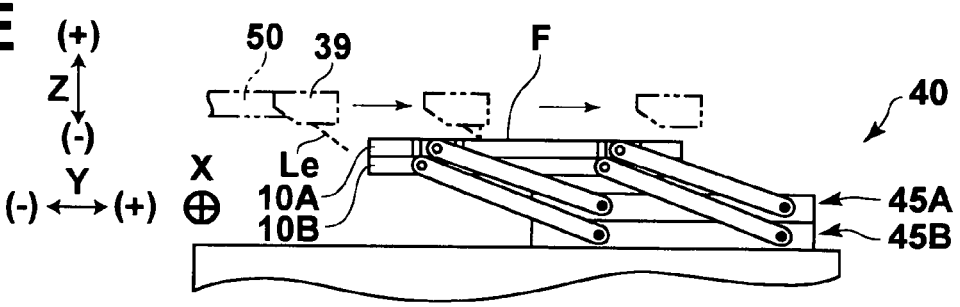

Then the detecting unit 39 is conveyed from the initial position P1 at a speed in the +Y-direction by the conveyor means 50 as shown in FIG. 4E, and low energy radiation image data representing a low energy radiation image recorded on the radiation image convertor panel 10A is obtained from the surface from which the radiation impinges upon the radiation image convertor panel 10A in the same manner as the high energy radiation image data was obtained from the radiation image convertor panel 10B. The low energy radiation image data output from the detecting head 30 is stored in the image memory 73A by way of the A/D convertor 71, the image buffer 72.

The low energy radiation image data stored in the image memory 73A and the high energy radiation image data stored in the image memory 73B are input into the energy subtraction system 75 or the superposition system 76.

The radiation image read-out apparatus 100 of this embodiment can be modified, for instance, as follows.

Detection of the stimulated emission from the surface of the radiation image convertor panel opposite to the surface from which the radiation impinges upon the radiation image convertor panel.

The radiation image read-out apparatus 100 of this embodiment may be modified to detect the stimulated emission from the surface of the radiation image convertor panels 10A and 10B opposite to the surface from which the radiation impinges upon the radiation image convertor panels 10A and 10B. In this case, the detecting unit 39 is mounted upside down on the conveyor means 50.

Detection of the stimulated emission from the surface of the radiation image convertor panel opposite to the surface from which the radiation impinges upon the radiation image convertor panel will be described in detail with reference to FIGS. 5A to 5D.

Figure 5A:
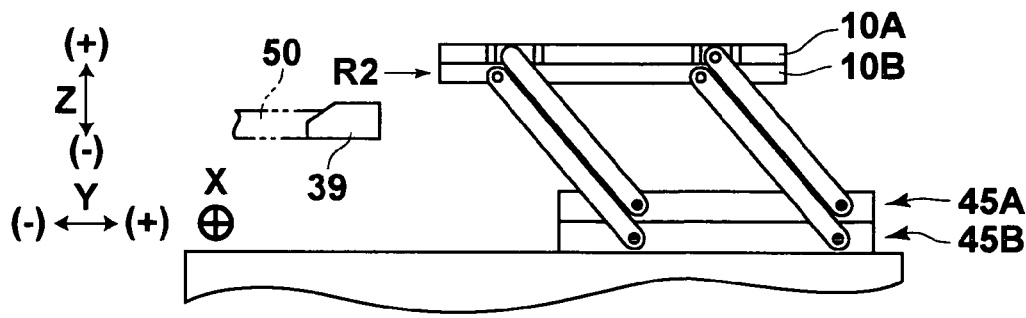
FIGS. 5A to 5D are views for illustrating detection of the stimulated emission from the surface of the radiation image convertor panel opposite to the surface from which the radiation impinges upon the radiation image convertor panel.

As shown in FIG. 5A, the radiation image convertor panels 10A and 10B are held in the radiation image recording position respectively by the first and second swing systems 45A and 45B. At this time, the radiation image convertor panel 10B is in a reading position R2. In this state, a low energy radiation image of the object 1 is recorded on the radiation image convertor panel 10A and a high energy radiation image of the object 1 is recorded on the radiation image convertor panel 10B in the same manner.

Figure 5B:
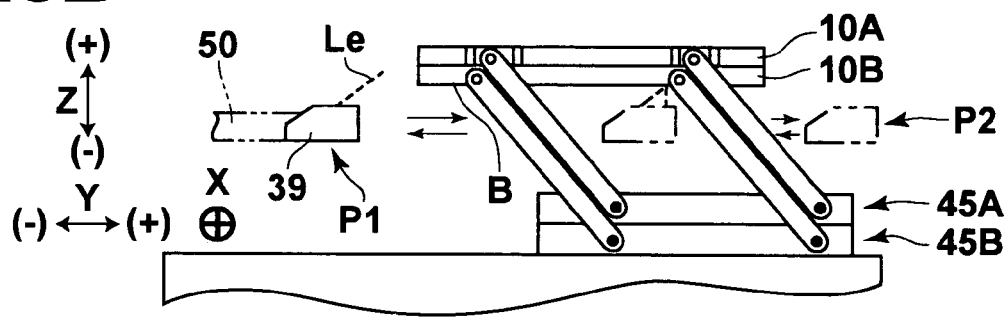

Then the detecting unit 39 is conveyed from the initial position P1 at a speed in the +Y-direction by the conveyor means 50 and a line-like stimulating light beam Le is projected onto the back surface B of the radiation image convertor panel 10B from the stimulating light projecting system 20 of the detecting unit 39 as shown in FIG. 5B. Stimulated emission emitted from a line-like area S on the back surface B of the radiation image convertor panel 10B exposed to the stimulating light beam Le is imaged on the line sensor 32, whereby high energy radiation image data representing a high energy radiation image recorded on the radiation image convertor panel 10B is output from the detecting unit 39. The detecting unit 39, which has been in the read-out end position P2 since reading of the radiation image on the radiation image convertor panel 10B was ended, is returned to the initial position P1 by the conveyor means 50.

The high energy radiation image data output from the detecting unit 39 is stored in the image memory 73B by way of the A/D convertor 71 and the image buffer 72.

Figure 5C:
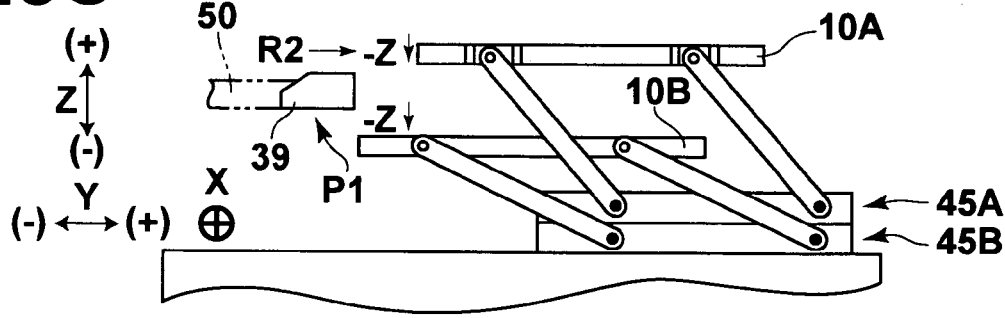

Thereafter, the radiation image convertor panel 10B is moved in −Z-direction away from the reading position R2 by the second swing system 45B and the radiation image convertor panel 10A is moved in −Z-direction to the reading position R2 by the first swing system 45A as shown in FIG. 5C.

Figure 5D:
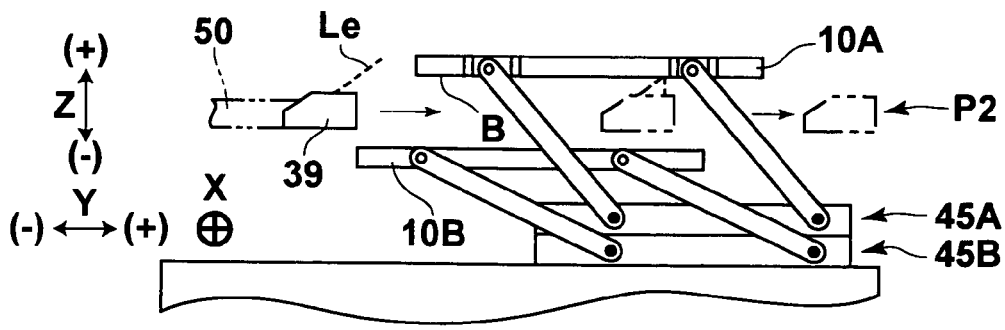

Then the detecting unit 39 is conveyed from the initial position P1 at a speed in the +Y-direction by the conveyor means 50 as shown in FIG. 5D, and low energy radiation image data representing a low energy radiation image recorded on the radiation image convertor panel 10A is obtained from the back surface B of the radiation image convertor panel 10A in the same manner as the high energy radiation image data was obtained from the radiation image convertor panel 10B. The low energy radiation image data output from the detecting head 30 is stored in the image memory 73A by way of the A/D convertor 71 and the image buffer 72.

The low energy radiation image data stored in the image memory 73A and the high energy radiation image data stored in the image memory 73B are input into the energy subtraction system 75 or the superposition system 76.

Detection of the stimulated emission on both the forward travel and the backward travel of the detecting unit.

The radiation image read-out apparatus 100 of this embodiment may be modified to detect the stimulated emission on both the forward travel and the backward travel of the detecting unit 39.

Detection of the stimulated emission on both the forward travel and the backward travel of the detecting unit 39 will be described in detail with reference to FIGS. 6A to 6C.

The radiation image convertor panels 10A and 10B are held in the radiation image recording position respectively by the first and second swing systems 45A and 45B and a low energy radiation image of the object 1 is recorded on the radiation image convertor panel 10A and a high energy radiation image of the object 1 is recorded on the radiation image convertor panel 10B in the same manner. At this time, the radiation image convertor panel 10B is in a reading position R2.

Figure 6A:
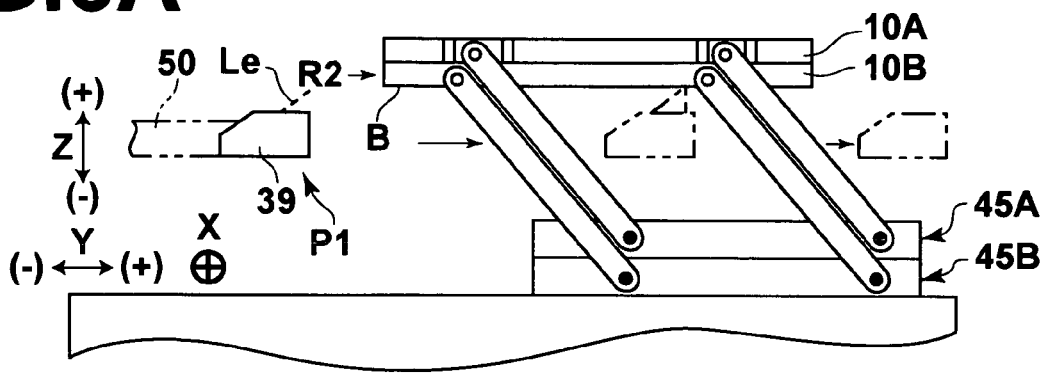
FIGS. 6A to 6C are views for illustrating detection of the stimulated emission on both the forward travel and the backward travel of the detecting unit.
Figure 6B:
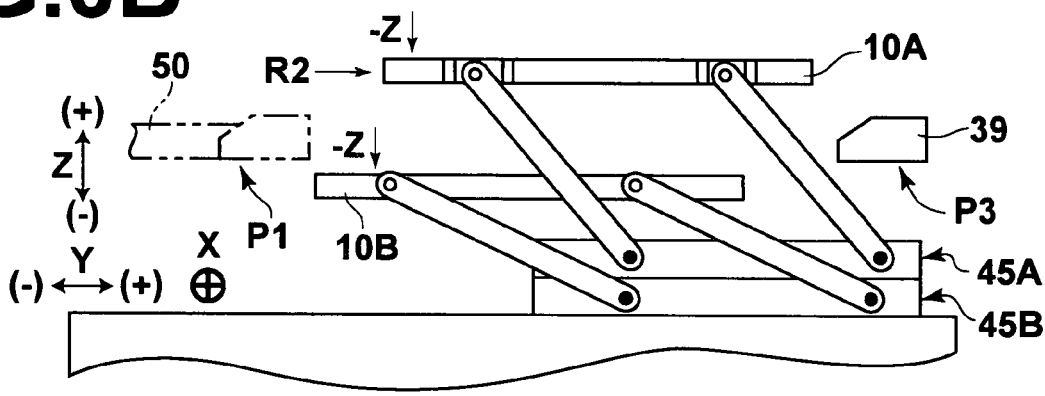
Figure 6C:
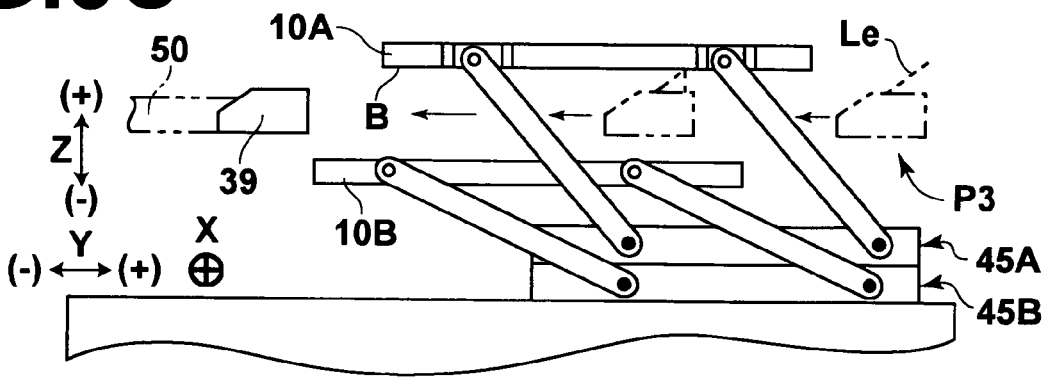

Then the detecting unit 39 is moved in the +Y-direction (the forward travel) with the radiation image convertor panels 10A and 10B held in the radiation image recording position shown in FIG. 6A. While being moved in the +Y-direction, the detecting unit 39 detects stimulated emission emitted from the radiation image convertor panel 10B from the backside B thereof, and thereafter the detecting unit 39 is caused to wait in a waiting position P3 as shown in FIG. 6B. Thereafter, as shown in FIG. 6C, the radiation image convertor panel 10B is moved in −Z-direction away from the reading position R2 by the second swing system 45B and the radiation image convertor panel 10A is moved in −Z-direction to the reading position R2 by the first swing system 45A as shown in FIG. 6B. Then the detecting unit 39 is moved in the −Y-direction (the backward travel) and while being moved in the −Y-direction, the detecting unit 39 detects stimulated emission emitted from the radiation image convertor panel 10A from the backside B thereof.

A radiation image read-out apparatus in accordance with another embodiment of the present invention will be described with reference to FIGS. 7A and 7B, hereinbelow.

In FIGS. 7A and 7B, the radiation image read-out apparatus of this embodiment is provided with a pair of radiation image convertor panels 10M and 10N superposed one on the other in a direction in which radiation emitted from a radiation source EX and passing through an object 1 propagates, a separator unit 40M which separates the superposed radiation image convertor panels 10M and 10N exposed to the radiation passing through the object 1 from each other by rotating about axes Hm and Hn on a plane parallel to the surfaces of the radiation image convertor panels 10M and 10N the superposed radiation image convertor panels 10M and 10N relatively to the other, a detecting unit 39 and a conveyor system 50M which conveys the detecting unit 39.

The conveyor system 50M comprises a cantilever support 51M which supports the detecting unit 39, a conveyor rail 52M and a driver 53M which moves the cantilever support 51M along the conveyor rail 52M.

The separator unit 40M comprises a first cantilever arm 41M which supports the radiation image convertor panel 10M and is rotatable about the axis Hm, a motor 42M which rotates the first cantilever arm 41M about the axis Hm, a second cantilever arm 41N which supports the radiation image convertor panel 10N and is rotatable about the axis Hn, and a motor 42N which rotates the second cantilever arm 41N about the axis Hn.

Figure 8A:
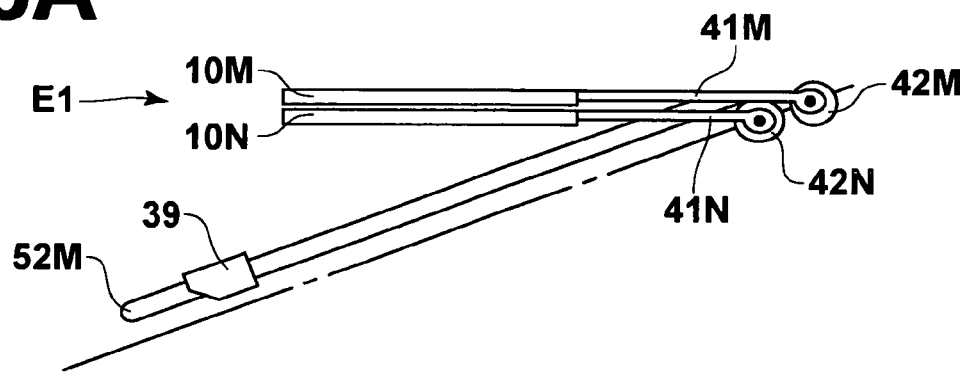
FIGS. 8A to 8C are views for illustrating detection of the stimulated emission on both the forward travel and the backward travel of the detecting unit in the radiation image read-out apparatus shown in FIGS. 7A and 7B, FIGS. 9A to 9C are views for illustrating detection of the stimulated emission after the superposed radiation image convertor panels are separated by moving in a parallel displacement one of the superposed radiation image convertor panels relatively to the other and subsequently rotating about an axis on a plane parallel to the surfaces of the radiation image convertor panels said one of the superposed radiation image convertor panels relatively to said the other.

When radiation images of the object 1 is recorded on the radiation image convertor panels 10M and 10N, the radiation image convertor panels 10M and 10N are superposed one on the other in a recording position E1 as shown in FIG. 8A.

Figure 8B:
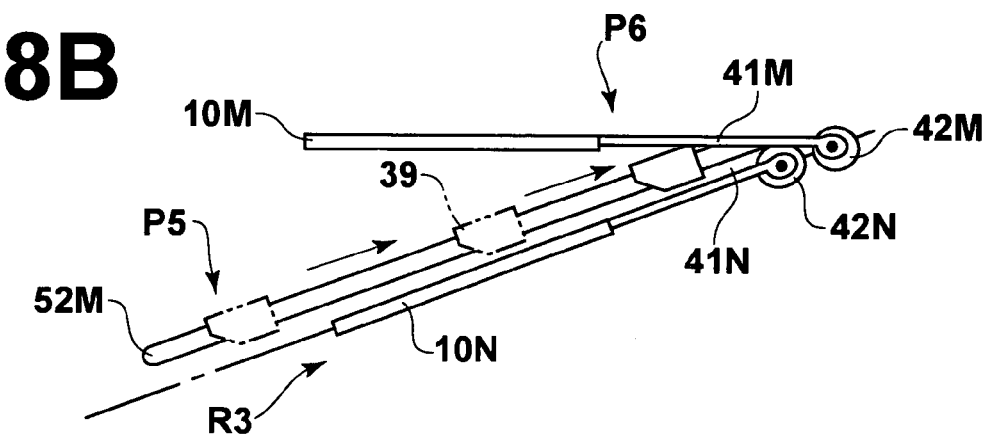

When stimulated emission is detected from the radiation image convertor panel 10N, the second cantilever arm 41N is rotated in the counterclockwise direction by the motor 42N to rotate the radiation image convertor panel 10N from the recording position E1 away from the radiation image convertor panel 10M to a reading position R3 as shown in FIG. 8B. Then stimulated emission is detected from the radiation image convertor panel 10N while the detecting unit 39 is moved along the conveyor rail 52M from an initial position P5. Thereafter the detecting unit 39 is caused to wait in a waiting position P6.

Figure 8C:
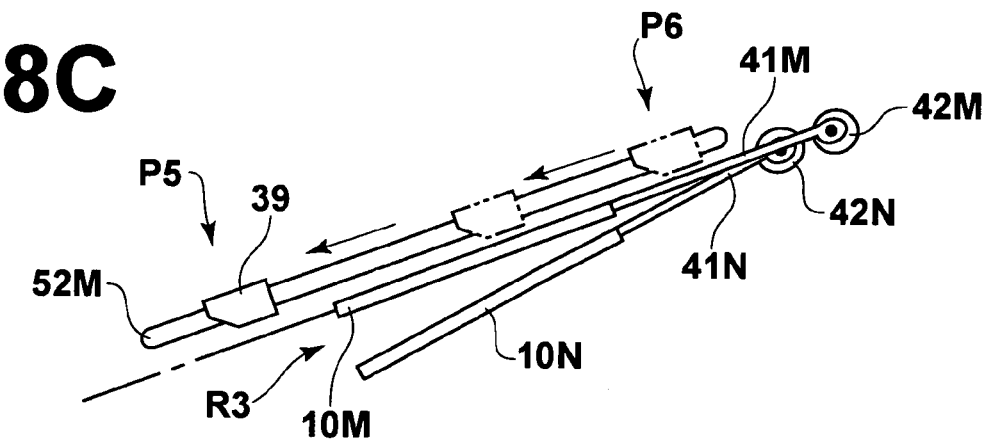

When stimulated emission is subsequently detected from the radiation image convertor panel 10M, the second cantilever arm 41N is further rotated in the counterclockwise direction by the motor 42N to rotate the radiation image convertor panel 10N away from the reading position R3 with the detecting unit 39 held in the waiting position P6 as shown in FIG. 8C. Thereafter, the first cantilever arm 41M is rotated in the counterclockwise direction by the motor 42M to rotate the radiation image convertor panel 10M from the recording position E1 to the reading position R3 as shown in FIG. 8C. Then stimulated emission is detected from the radiation image convertor panel 10M while the detecting unit 39 is moved along the conveyor rail 52M from the waiting position P6 toward the initial position P5.

Figure 9A:
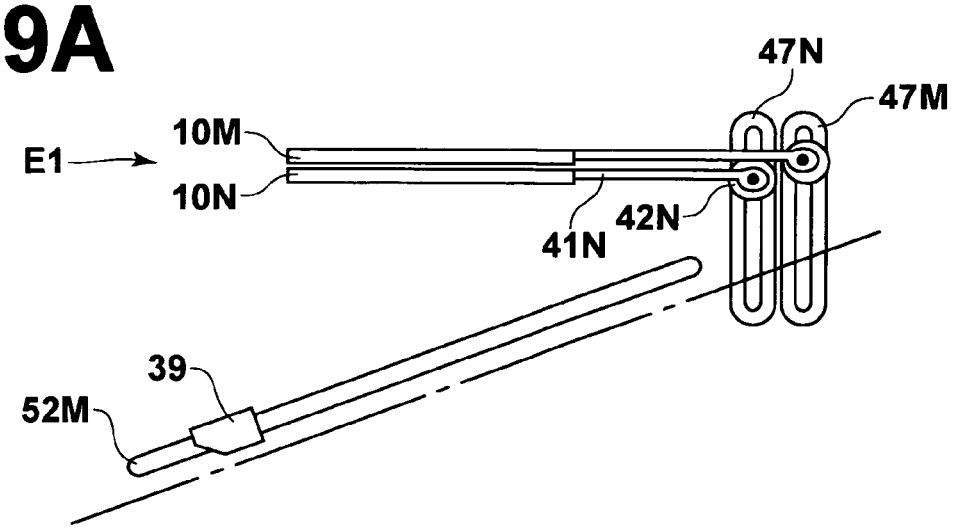
Figure 9B:
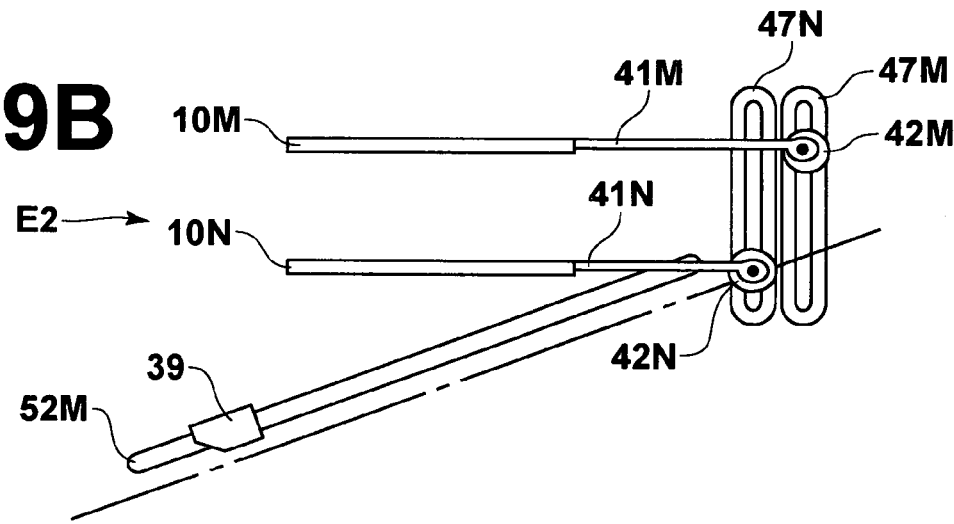
Figure 9C:
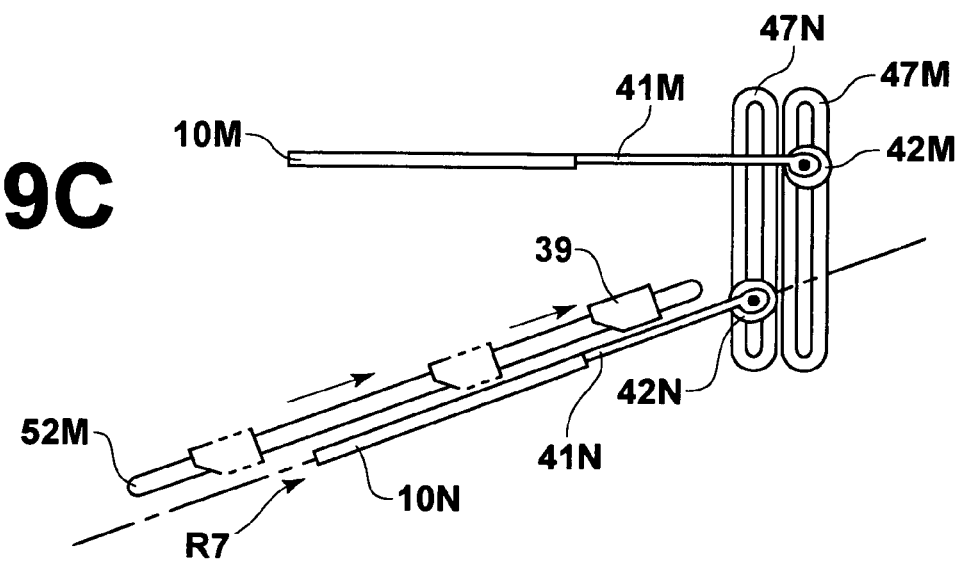

Though, in the embodiments described above, the separator separates the superposed radiation image convertor panels by moving in a parallel displacement or rotating about an axis on a plane parallel to the surfaces of the radiation image convertor panels one of the superposed radiation image convertor panels relatively to the other, the separator may separate the superposed radiation image convertor panels by moving in a parallel displacement one of the superposed radiation image convertor panels relatively to the other and subsequently rotating about an axis on a plane parallel to the surfaces of the radiation image convertor panels said one of the superposed radiation image convertor panels relatively to said the other. In this case, for instance, the separator unit shown in FIG. 7 is further provided with parallel displacement systems 47M and 47N which move in a parallel displacement respectively the assembly of the motor 42M and the first cantilever arm 41M and the assembly of the motor 42N and the second cantilever arm 41N as shown in FIGS. 9A to 9C. A low energy radiation image and a high energy radiation image are first recorded respectively on the radiation image convertor panels 10M and 10N in the manner shown in FIG. 9A. Thereafter, the assembly of the motor 42N and the second cantilever arm 41N with the radiation image convertor panel 10N mounted on the cantilever arm 41N is moved downward in a parallel displacement by the parallel displacement system 47N to move the radiation image convertor panel 10N from the recording position E1 to a position E2 as shown in FIG. 9B. Then the motor 42N is energized to counterclockwise rotate the cantilever arm 41N to bring the radiation image convertor panel 10N to a reading position R7, and stimulated emission is detected from the radiation image convertor panel 10N while the detecting unit 39 is moved along the conveyor rail 52M. When stimulated emission is subsequently detected from the radiation image convertor panel 10M, the radiation image convertor panel 10N is moved away from the reading position R7 by driving the parallel displacement system 47N and/or the motor 42N. Thereafter, the radiation image convertor panel 10M is positioned in the reading position R7 in the same manner and stimulated emission is detected from the radiation image convertor panel 10M while the detecting unit 39 is moved along the conveyor rail 52M.

Radiation image convertor panel provided with a light emitting plate which emits erasing light.

Figure 10:
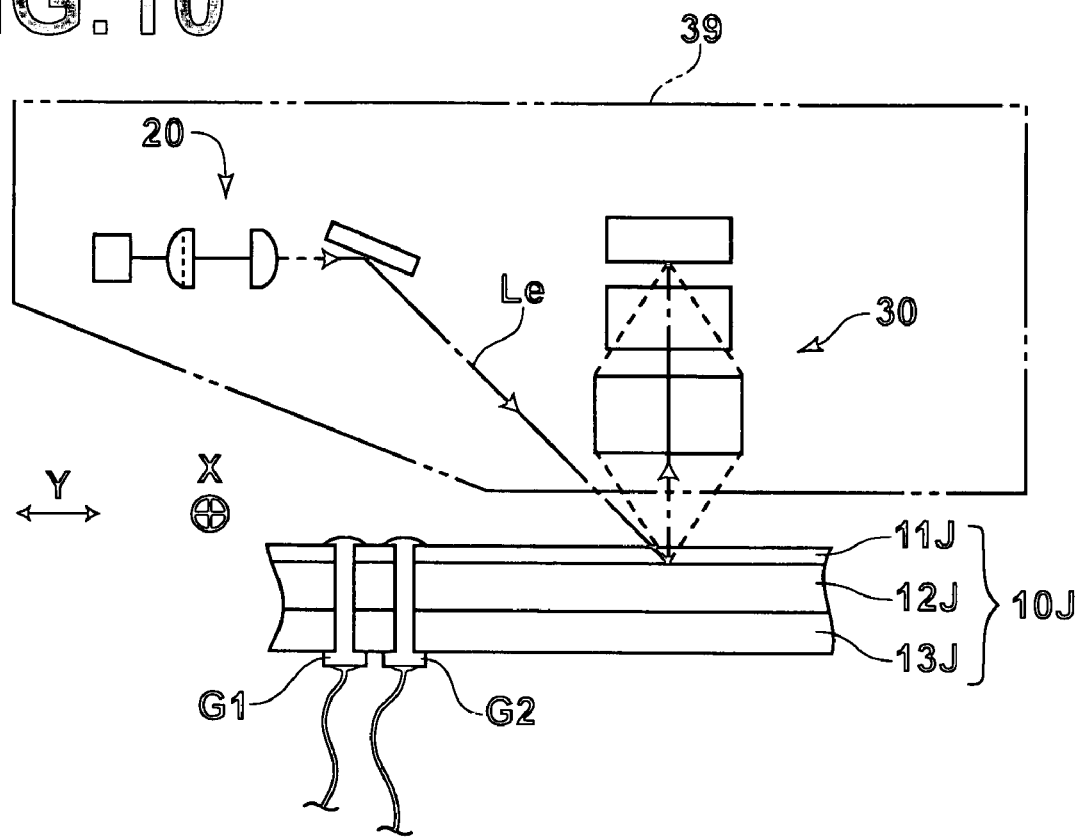
FIG. 10 is a side view showing a radiation image convertor panel provided with a light emitting plate which erases radiation energy remaining in the radiation image convertor panel.

FIG. 10 shows a radiation image convertor panel 10J provided with a light emitting plate which erases radiation energy remaining in the radiation image convertor panel.

As shown in FIG. 10, the radiation image convertor panel 10J comprises a substrate 13J, a stimulable phosphor layer 12J formed on the substrate 13J and a light emitting plate 11J which is of, for instance, an organic EL which transmits (is transparent to) the radiation, the stimulating light and the stimulated emission and emits erasing light which erases radiation energy remaining in the radiation image convertor panel 10J, and is provided on the surface of the stimulable phosphor layer 12J from which the stimulated emission is detected. When the radiation image convertor panel 10J is used, the radiation energy remaining in the stimulable phosphor layer 12J after the end of detection of the stimulated emission from the radiation image convertor panel 10J can be erased by activating the light emitting plate 11J to emit erasing light. The radiation image convertor panel 10J is provided with a pair of power contacts G1 and G2 through which the power is provided to the light emitting plate 11J. When the light emitting plate is provided on the side of the radiation image convertor panel opposite to the side from which the recording radiation and the stimulating light are projected onto the radiation image convertor panel, the light emitting plate need not be transparent to the recording radiation and the stimulating light. Further when the light emitting plate is provided on the side of the radiation image convertor panel opposite to the side from which the stimulated emission is detected, the light emitting plate need not be transparent to the stimulated emission.

Radiation image convertor panel provided with a radiation absorbing filter.

Figure 11:
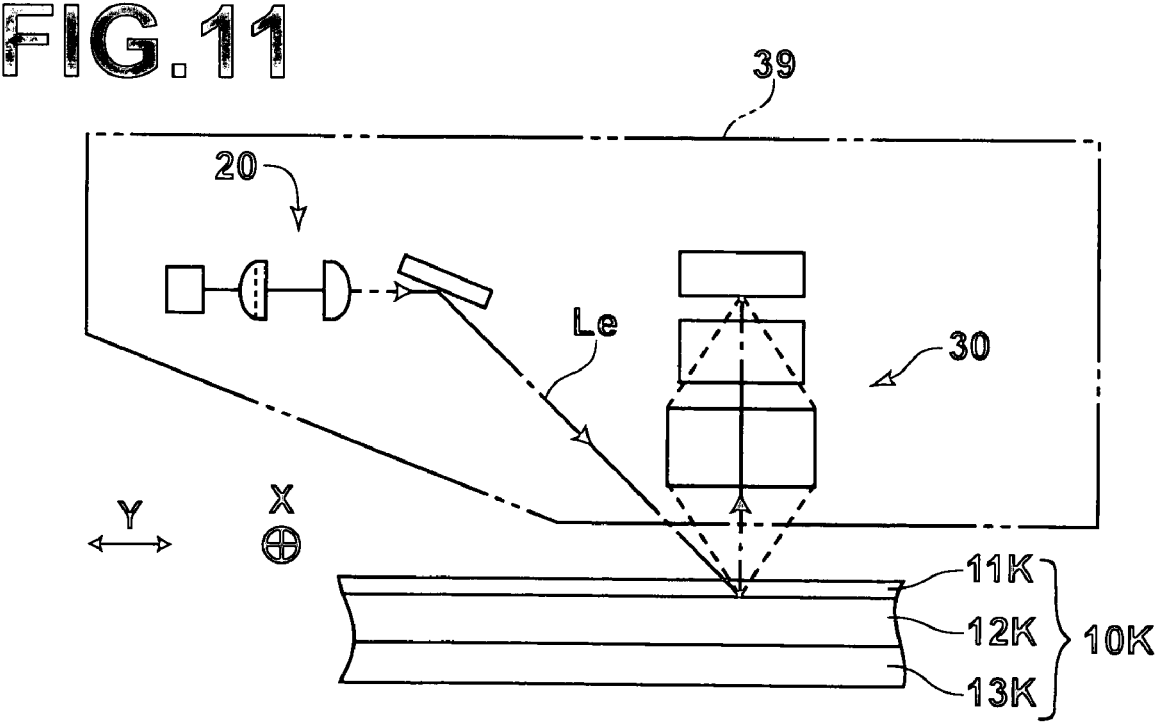
FIG. 11 is a side view showing a radiation image convertor panel provided with a radiation absorbing filter.

FIG. 11 shows a radiation image convertor panel 10K provided with a radiation absorbing filter.

As shown in FIG. 11, the radiation image convertor panel 10K comprises a radiation absorbing filter 13K which is a radiation energy separation filter comprising a glass plate, an acrylic plate or the like which absorbs high energy components of the radiation and transmits the stimulating light and the stimulated emission, a stimulable phosphor layer 12K, and a light emitting plate 11k which emits the erasing light and formed on the surface of the stimulable phosphor layer 12K opposite to the radiation absorbing filter 13K. The radiation absorbing filter may be provided either on the surface opposite to the surface facing the object of the radiation image convertor panel nearer to the object than the other in a pair of radiation image convertor panels which are exposed to radiation passing through the object in a superposed state or on the surface facing the object of the radiation image convertor panel remoter from the object than the other in the radiation image convertor panels which are exposed to radiation passing through the object in a superposed state. By providing such a radiation absorbing filter on the radiation image convertor panel, it becomes unnecessary to provide a radiation absorbing filter in addition to the radiation image convertor panel, which further reduces the overall size of the energy subtraction apparatus. The radiation absorbing filter may double as the substrate of the radiation image convertor panel. The radiation absorbing filter may comprise a glass plate, an acrylic plate or the like coated with carbon, metal such as copper, iron, or the like, a metal compound, or the like. By the use of such a radiation absorbing filter, the energy distribution of the radiation to which the radiation image convertor panel is exposed when recording a radiation image on the radiation image convertor panel is optimized.

Radiation image convertor panel provided with a locator member which keeps the space between the detecting head and the surface of the radiation image convertor panel.

Figure 12A:
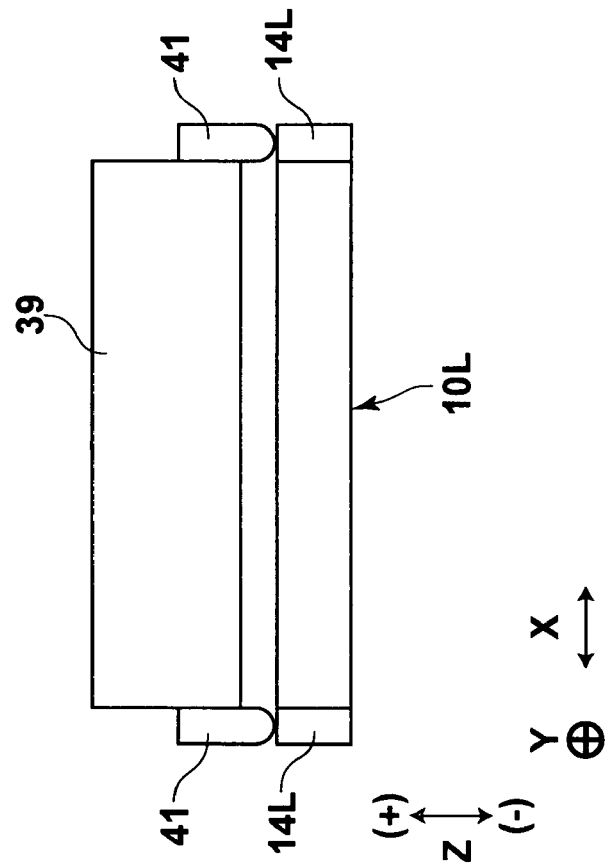
FIG. 12A is a side view showing a radiation image convertor panel provided with a locator member which keeps the space between the detecting head and the surface of the radiation image convertor panel at a predetermined space during detection of the stimulated emission from the radiation image convertor panel.
Figure 12B:
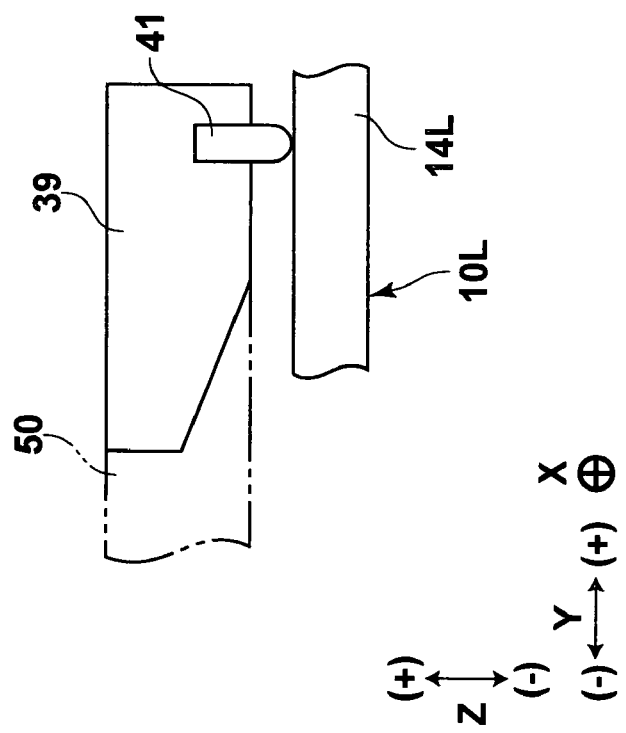
FIG. 12B is a front elevation of the same.

FIG. 12A is a side view showing a radiation image convertor panel provided with a locator member which keeps the space between the detecting head and the surface of the radiation image convertor panel at a predetermined space during detection of the stimulated emission from the radiation image convertor panel, and FIG. 12B is a front elevation of the same.

As shown in FIGS. 12A and 12B, the radiation image convertor panel 10L is provided with a pair of focusing reference rails 14L which keep the space between the detecting head 30 and the front surface F of the radiation image convertor panel 10L at a predetermined space during detection of the stimulated emission from the radiation image convertor panel 10L. The focusing reference rails 14L extend in the sub-scanning direction Y and are provided on side surfaces of the radiation image convertor panel 10L opposed to each other in the main scanning direction X. A pair of follower contactors 41 extend in the −Z-direction respectively from side surfaces of the detecting unit 39 opposed to each other in the main scanning direction X into contact with the respective focusing reference rails 14L. That is, by moving the detecting unit 39 by the conveyor means 50 with the follower contactors 41 kept in contact with the respective focusing reference rails 14L, the space between the radiation image convertor panel 10L and the detecting head 30 can be kept at a predetermined space. In the case where the conveyor means 50 is moved before detection of the stimulated emission from the radiation image convertor panel 10L, for instance, the radiation image convertor panel 10b may be arranged to urge the follower contactors 41 into contact with the respective focusing reference rails 14L under the action of the separator unit.

Superposition of radiation image convertor panels which are different in rate of radiation absorption.

The radiation image convertor panels which are superposed one on another maybe different in rate of radiation absorption. For example, when a first radiation image convertor panel 10A and a second radiation image convertor panel 10B is superposed in this order from the object 1 as shown in FIG. 1, the second radiation image convertor panel 10B remoter from the object 1 than the first radiation image convertor panel 10A may be higher than the first radiation image convertor panel 10A. The rate of radiation absorption of the radiation image convertor panel can be changed by changing the material of the stimulable phosphors, changing the packing density of the stimulable phosphors and/or the like.

Variation of the systems for detecting the stimulated emission by radiation image convertor panels. The radiation image read-out apparatus may detect the stimulated emission from the respective radiation image convertor panels in different systems. For example, the radiation image read-out apparatus may detect the stimulated emissions from the radiation image convertor panels so that high-frequency component of the information representing the object is more abbreviated in a radiation image convertor panel which is positioned remoter from the object when the radiation image convertor panels are exposed to the radiation passing through the object. Such detection can be performed in the following systems.

<System of Detection—1: The Detecting Resolution and The Detecting Sensitivity are Changed by Radiation Image Convertor Panels>

Figure 13B:
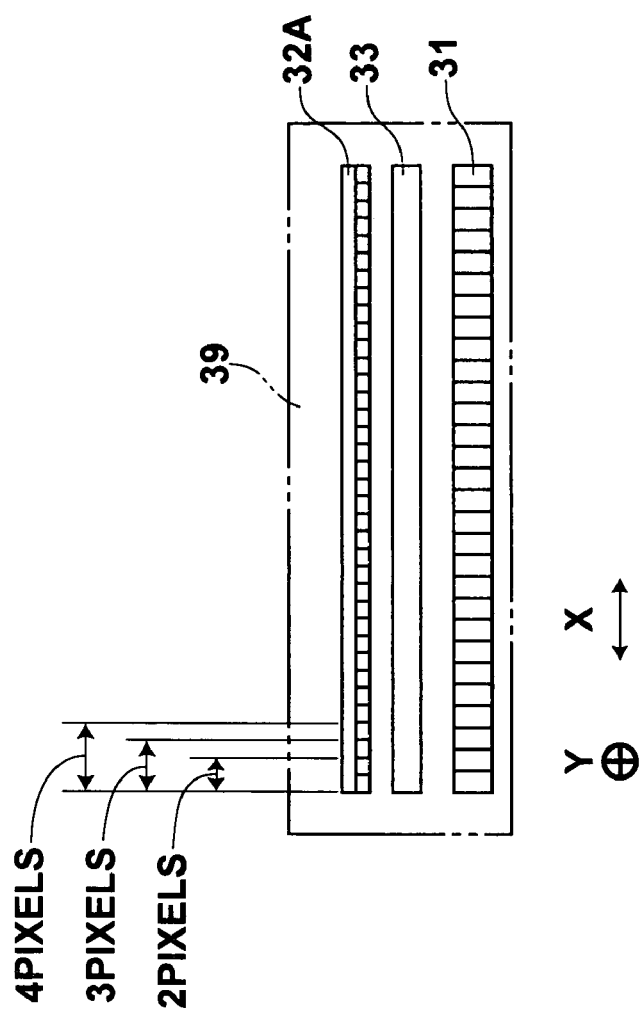
FIG. 13B is a front elevation of the same.
Figure 13A:
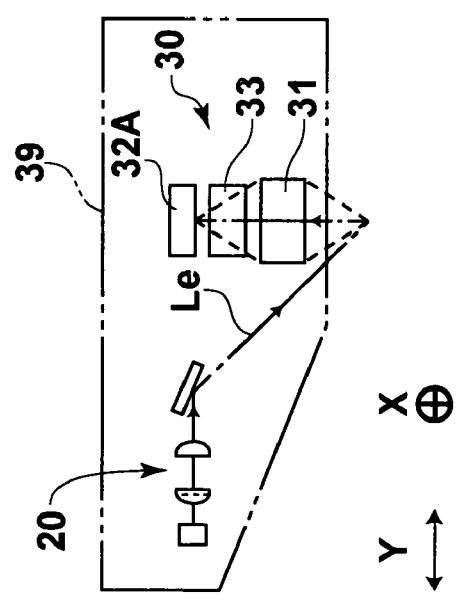
FIG. 13A is a side view showing a detecting head which is formed of CCD elements and in which signal charges are obtained by binning.

FIG. 13A is a side view showing a detecting head which is formed of CCD elements and in which signal charges are obtained by binning, and FIG. 13B is a front elevation of the same.

The radiation image read-out apparatus may detect the stimulated emissions from the radiation image convertor panels so that the stimulated emission is detected at a lower resolution from a radiation image convertor panel which is positioned remoter from the object when the radiation image convertor panels are exposed to the radiation passing through the object and the stimulated emission emitted from a wider area of the radiation image convertor panel can be detected. For example, when the line sensor 32A comprises CCD elements, electric charges stored in CCD elements corresponding to a plurality (e.g., 2, 3 or 4) of pixels arranged in the main scanning direction X as a result of photoelectric conversion of stimulated emission received may be subjected to binning and then detected as shown in FIGS. 13A and 13B. As a result, sensitivity in detecting the stimulated emission is increased and S/N is improved. That is, the resolution when the stimulated emission emitted from a radiation image convertor panel on which a high energy radiation image has been recorded is to be detected need not be so high as the resolution when the stimulated emission emitted from a radiation image convertor panel on which a low energy radiation image is recorded is to be detected. Whereas since the stored energy stored in a radiation image convertor panel when a high energy radiation image is recorded, it is effective to detect the stimulated emission emitted from a radiation image convertor panel, on which the high energy radiation image is recorded, at a high sensitivity by the sacrifice of the resolution.

<System of Detection—2: Setting of Cycle Times for Obtaining Image Data by Radiation Image Convertor Panels>

Since the stimulated emission emitted from a radiation image convertor panel remoter from the object may be detected at a lower resolution, the cycle time for obtaining image data from a remoter radiation image convertor panel may be shortened by moving the detecting head at a higher speed. For example, when radiation images are taken with radiation image convertor panels 10A and 10B are superposed in this order from the object side as shown in FIG. 1, the cycle time for obtaining image data from a remoter radiation image convertor panel 10B may be shortened by moving the detecting head at a higher speed than when image data is obtained from the other radiation image convertor panel 10A.

<System of Detection—3: Setting of the Intensities of the Stimulating Light by Radiation Image Convertor Panels>

Since the stimulated emission emitted from a radiation image convertor panel remoter from the object may be detected at a lower resolution, the intensity of the stimulating light to be projected onto a remoter radiation image convertor panel may be weaker. For example, when radiation images are taken with radiation image convertor panels 10A and 10B are superposed in this order from the object side as shown in FIG. 1, the intensity of the stimulating light to be projected onto a remoter radiation image convertor panel 10B may be weaker than that to projected onto the other radiation image convertor panel 10A.

<Variation of System of Detection by the Detecting Unit>

Further, though, in the embodiments described above, the present invention is applied to a so-called line-beam system radiation image read-out apparatus where a line-like stimulating light beam is projected onto the radiation image convertor panel and the stimulated emission emitted from the radiation image convertor panel upon exposure to the line-like stimulating light beam is detected by a line sensor, the present invention can be applied to a so-called point-scan system radiation image read-out apparatus where a spot-like stimulating light beam is caused to scan the radiation image convertor panel in the main scanning direction, for instance, by a polygonal scanner, and stimulated emission emitted from the radiation image convertor panel in a time series upon exposure to the spot-like stimulating light beam is detected by a photomultiplier through a light guide.

Figure 14:
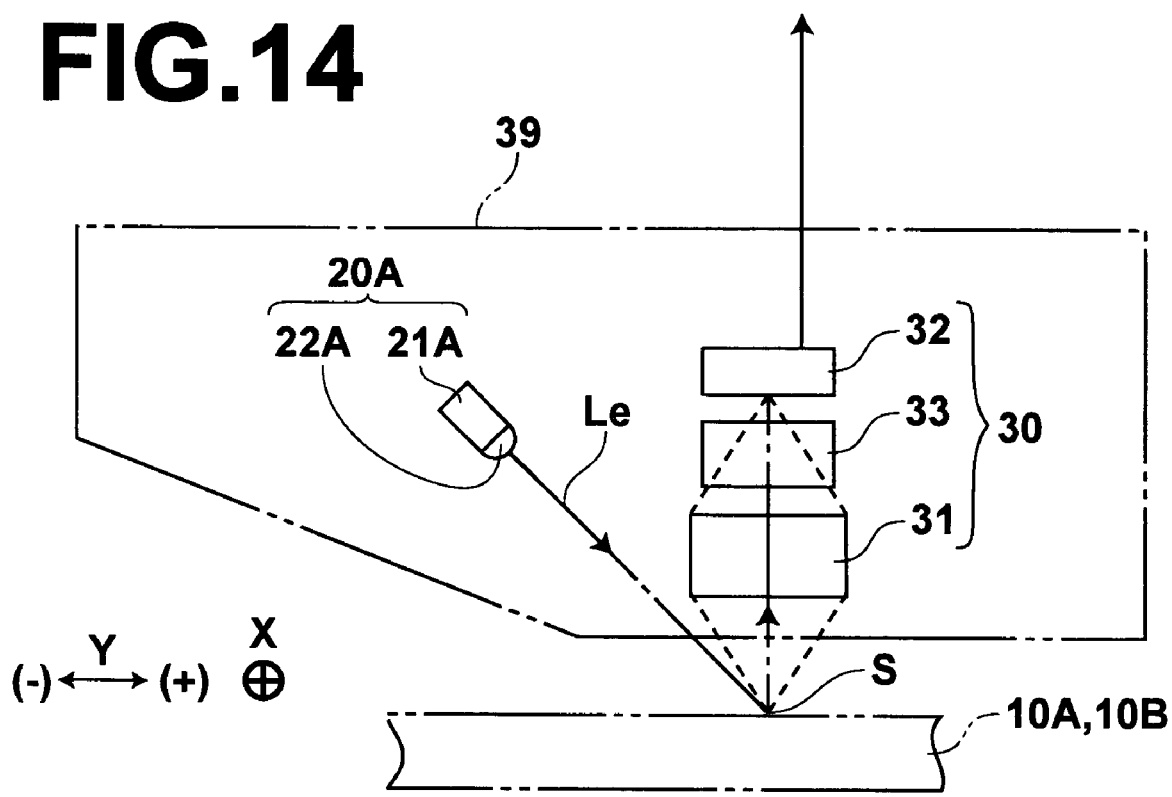
FIG. 14 is a side view showing a modification of the stimulating light projecting system of the detecting head.

Further, the stimulating light projecting system of the detecting unit need not be limited to that described above but may be as shown in FIG. 14. That is, the modification 20A of the stimulating light projecting system shown in FIG. 14 comprises a stimulating light source 21A including a plurality of semiconductor lasers which emit stimulating light Le and are arranged in the main scanning direction X, and a condenser optical system 22A including a cylindrical lens which extends in the main scanning direction X and converges the stimulating light Le emitted from the stimulating light source 21A in a line-like area S on the radiation image convertor panel.

<Variation of System of Moving Upon Detection of the Stimulated Emission>

Though, in the embodiments described above, the stimulated emission is detected by moving the detecting unit, the stimulated emission may be detected by moving the radiation image convertor panel with the detecting unit kept stationary or by moving both the radiation image convertor panel and the detecting unit.

Further, though, in the embodiments described above, two radiation image convertor panels are superposed one on the other in a direction in which the radiation passing through the object propagates, three or more radiation image convertor panels may be superposed one on another.

Further, image data may be obtained from only one of the superposed radiation image convertor panels.

The stimulable phosphors forming the stimulable phosphor layer of the radiation image convertor panel are represented by chemical formulae BFX, CsX, RbX and the like.

What is claimed is:

1. A radiation image read-out apparatus comprising
a plurality of radiation image convertor panels superposed one on another in a direction in which radiation passing through an object propagates,
a separator which separates the superposed radiation image convertor panels exposed to the radiation passing through the object from one another by rotating about an axis on a plane parallel to the surfaces of the radiation image convertor panels one or more of the superposed radiation image convertor panels relatively to the others, and
a single detecting head which detects stimulated emission emitted from each of the radiation image convertor panels separated by the separator,
thereby obtaining a plurality of pieces of image data each representing a radiation image of the object recorded on each of the radiation image convertor panels by exposure to the radiation on the basis of output from the detecting head.

2. A radiation image read-out apparatus comprising
a plurality of radiation image convertor panels superposed one on another in a direction in which radiation passing through an object propagates,
a separator which separates the superposed radiation image convertor panels exposed to the radiation passing through the object from one another by moving in a parallel displacement and rotating about an axis on a plane parallel to the surfaces of the radiation image convertor panels one or more of the superposed radiation image convertor panels relatively to the others, and
a single detecting head which detects stimulated emission emitted from each of the radiation image convertor panels separated by the separator,
thereby obtaining a plurality of pieces of image data each representing a radiation image of the object recorded on each of the radiation image convertor panels by exposure to the radiation on the basis of output from the detecting head.

3. A radiation image read-out apparatus as defined in claim 1 or 2 in which the detecting head detects the stimulated emission from the surface of the radiation image convertor panel from which the radiation impinges upon the radiation image convertor panel.

4. A radiation image read-out apparatus as defined in claim 1 or 2 in which the detecting head detects the stimulated emission from the surface of the radiation image convertor panel opposite to the surface from which the radiation impinges upon the radiation image convertor panel.

5. A radiation image read-out apparatus as defined in claim 1 or 2 further comprising an image processing means which carries out an energy subtraction processing or a superposition processing by the use of the pieces of image data obtained from the respective radiation image convertor panels.

6. A radiation image read-out apparatus as defined in claim 1 or 2 further comprising a moving means which moves the detecting head along each of the separated radiation image convertor panels in which the detecting head detects the stimulated emission while being moved by the moving means.

7. A radiation image read-out apparatus as defined in claim 1 or 2 further comprising a reciprocating means which reciprocates back and forth the detecting head along each of the separated radiation image convertor panels in which the detecting head detects the stimulated emission on both the forward travel and the backward travel by the reciprocating means.

8. A radiation image read-out apparatus as defined in claim 1 or 2 in which the radiation image convertor panels are different in shape.

9. A radiation image read-out apparatus as defined in claim 1 or 2 in which the radiation image convertor panels are provided with a locator member which keeps the space between the detecting head and the surface of the radiation image convertor panel facing the detecting head at a predetermined space during detection of the stimulated emission from the radiation image convertor panel.

10. A radiation image read-out apparatus as defined in claim 1 or 2 in which each of the radiation image convertor panels is provided thereon with a light emitting plate which transmits the radiation and emits erasing light which erases radiation energy remaining in the radiation image convertor panel.

11. A radiation image read-out apparatus as defined in claim 1 or 2 in which the radiation image convertor panels are arranged so that a radiation image convertor panel remoter from the object absorbs more radiation when all the radiation image convertor panels are exposed to given radiation under the same conditions.

12. A radiation image read-out apparatus as defined in claim 1 or 2 which detects the stimulated emissions from the radiation image convertor panels so that high-frequency component of the information representing the object is more abbreviated in a radiation image convertor panel which is positioned remoter from the object when the radiation image convertor panels are exposed to the radiation passing through the object.

13. A radiation image read-out apparatus as defined in claim 1 or 2 in which the radiation image convertor panel comprises a stimulable phosphor layer and a substrate which supports the stimulable phosphor layer, and the substrate doubles as a radiation absorbing filter which absorbs the radiation.

14. A radiation image read-out apparatus as defined in claim 1 or 2 in which the radiation image convertor panel comprises a substrate and a stimulable phosphor layer of columnar crystal stimulable phosphors formed on the substrate by vapor building-up.

* * * * *